(12) United States Patent
Clement et al.

(10) Patent No.: US 7,720,454 B1
(45) Date of Patent: May 18, 2010

(54) EXTREMELY LOW IF ARCHITECTURE FOR IN-BAND ON-CHANNEL (IBOC) RADIO

(75) Inventors: Patrick Clement, Belmont (CH); David Cousinard, Morges (CH)

(73) Assignee: Marvell International Ltd., Hamilton (BM)

( * ) Notice: Subject to any disclaimer, the term of this patent is extended or adjusted under 35 U.S.C. 154(b) by 883 days.

(21) Appl. No.: 11/582,067

(22) Filed: Oct. 17, 2006

Related U.S. Application Data

(60) Provisional application No. 60/779,801, filed on Mar. 7, 2006.

(51) Int. Cl.
*H04B 1/16* (2006.01)

(52) U.S. Cl. .................. 455/258; 455/323; 375/340

(58) Field of Classification Search .................. 455/132, 455/227, 255, 258, 266, 296, 313, 323, 334, 455/339; 375/232, 270, 298, 316, 334, 340
See application file for complete search history.

(56) References Cited

U.S. PATENT DOCUMENTS

| | | | | |
|---|---|---|---|---|
| 6,466,776 B1 * | 10/2002 | Okanobu | .................. | 455/343.2 |
| 6,671,340 B1 * | 12/2003 | Kroeger et al. | .............. | 375/350 |
| 7,106,809 B2 * | 9/2006 | Whikehart et al. | .......... | 375/316 |
| 7,164,894 B2 * | 1/2007 | Nagahama et al. | ........ | 455/168.1 |
| 7,224,939 B2 * | 5/2007 | Takayama et al. | ............. | 455/45 |

* cited by examiner

*Primary Examiner*—Blane J Jackson

(57) ABSTRACT

A radio frequency (RF) receiver includes an intermediate frequency (IF) mixer that generates an output signal based on mixing a hybrid in-band, on-channel (IBOC) signal with an intermediate frequency signal. An oscillator generates the intermediate frequency signal; wherein the intermediate frequency is less than a bandwidth of the IBOC signal.

45 Claims, 16 Drawing Sheets

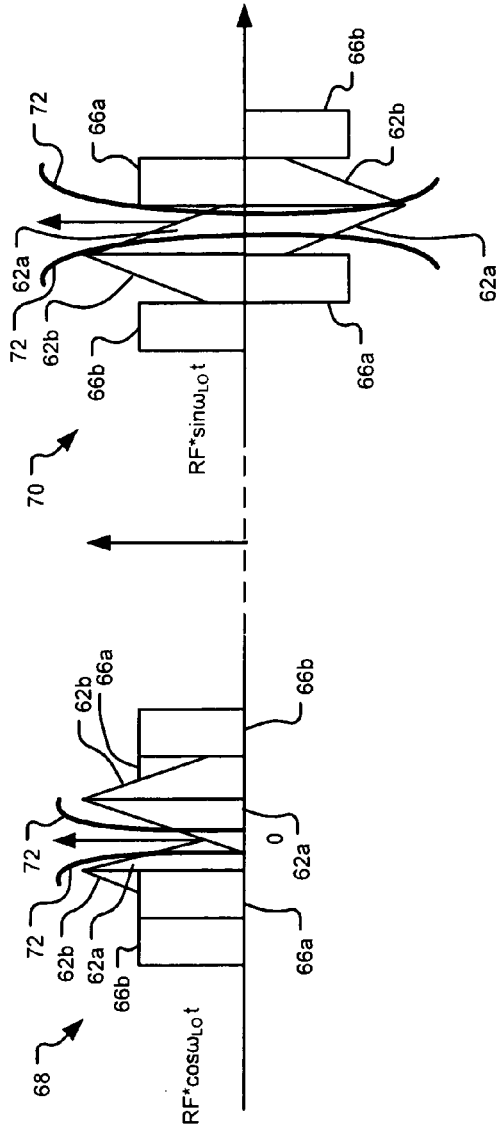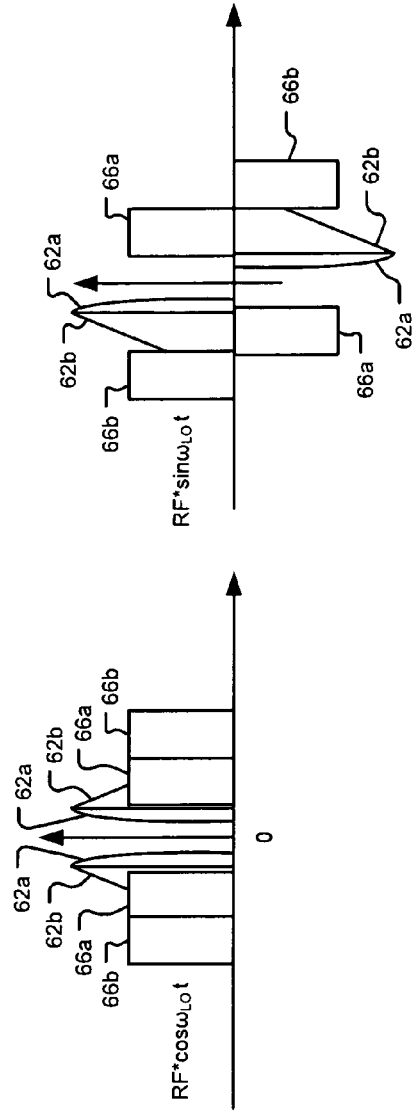

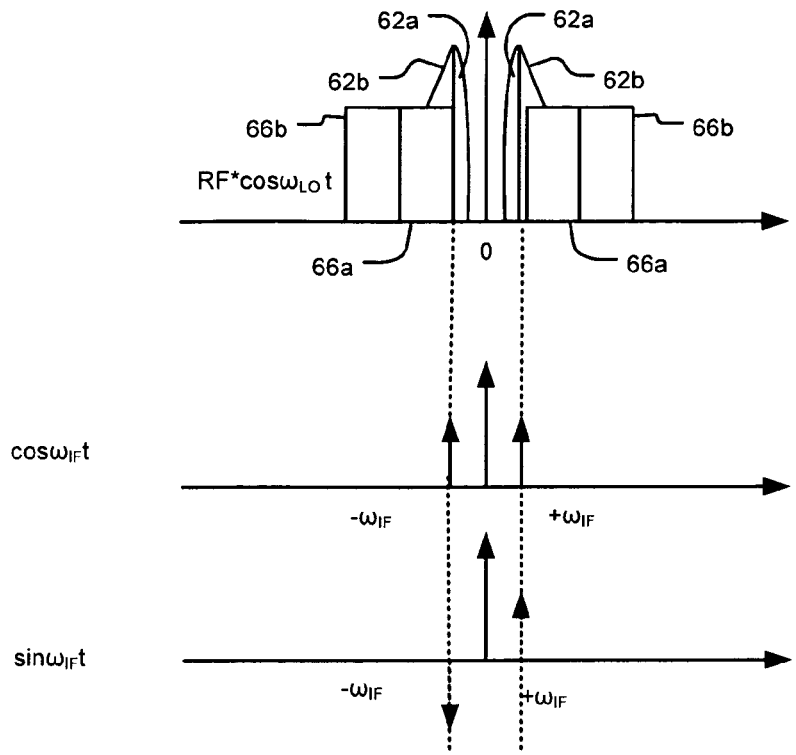
FIG. 6A
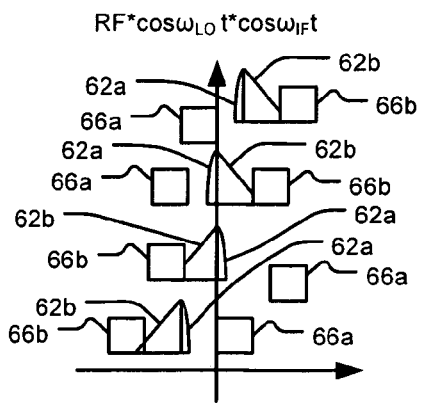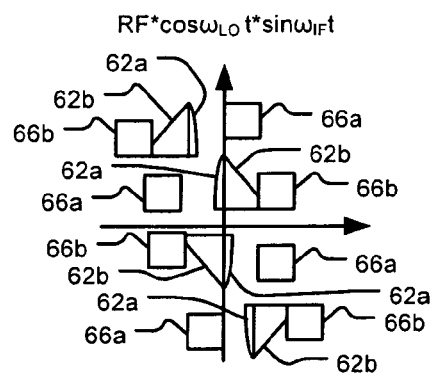
FIG. 6B  FIG. 6C

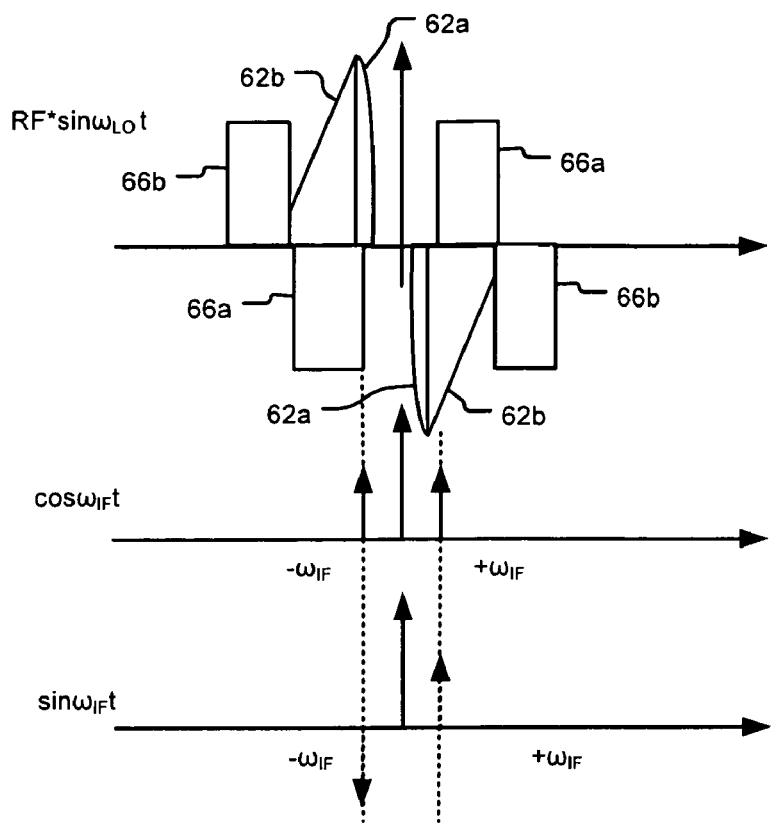
FIG. 7A
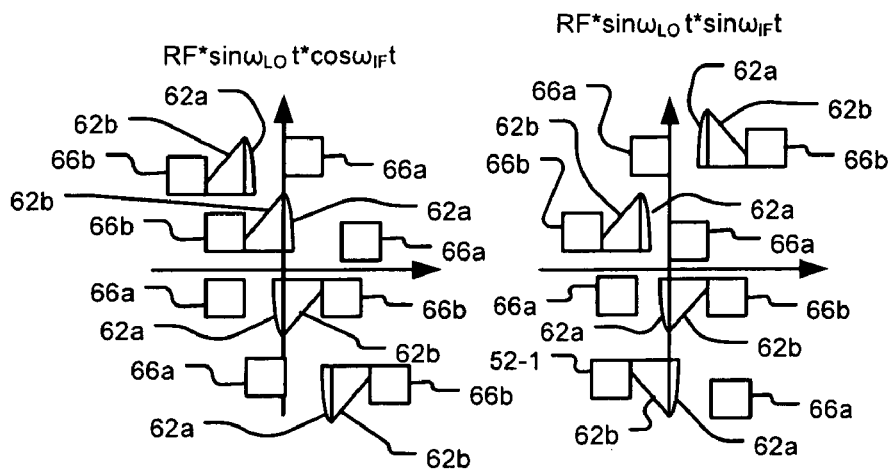
FIG. 7B  FIG. 7C

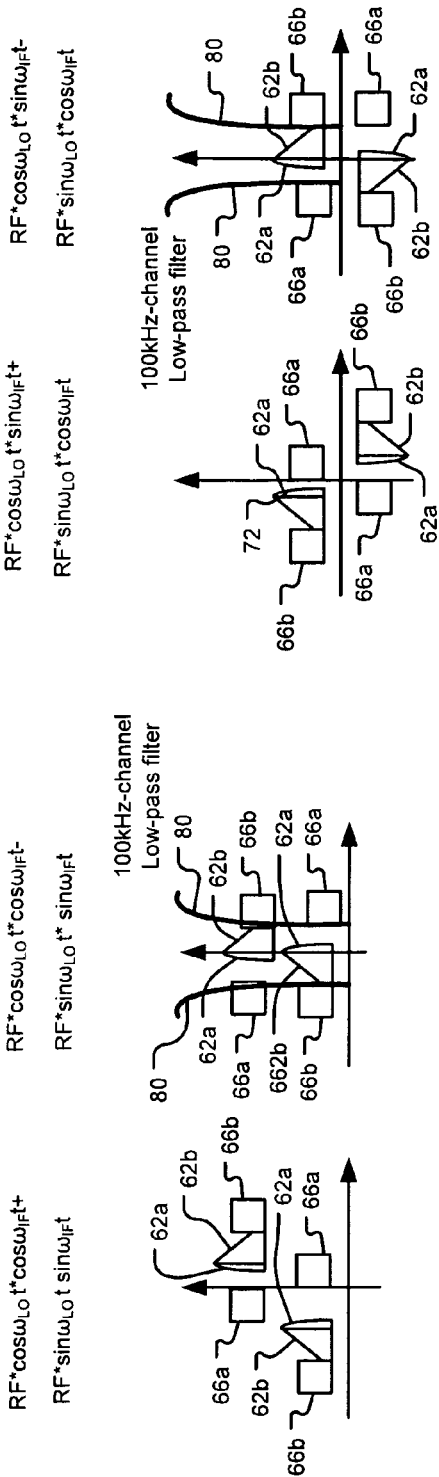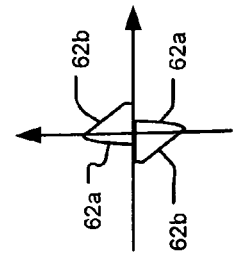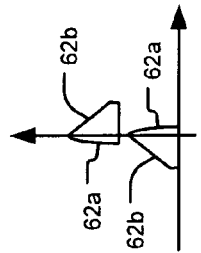

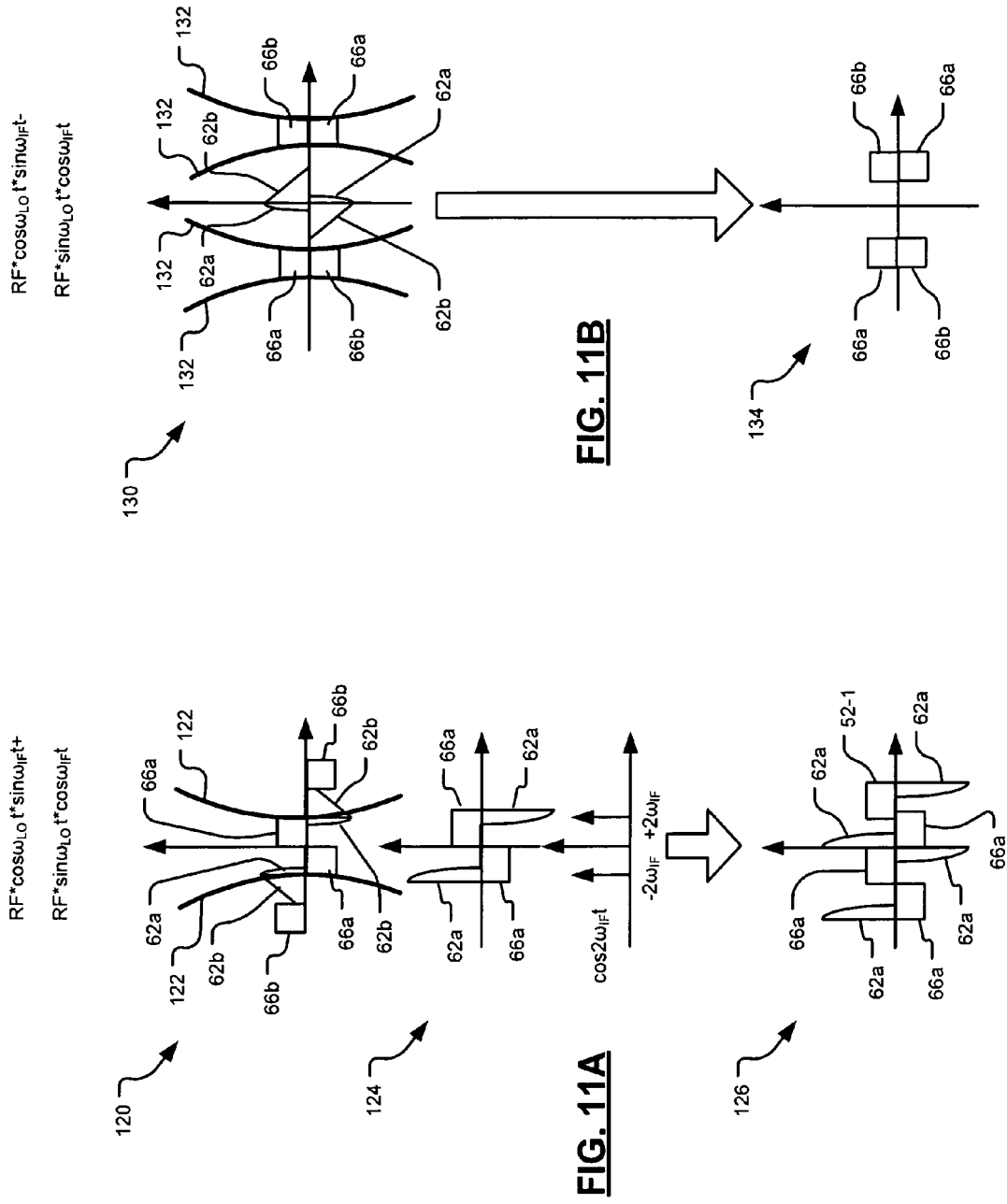

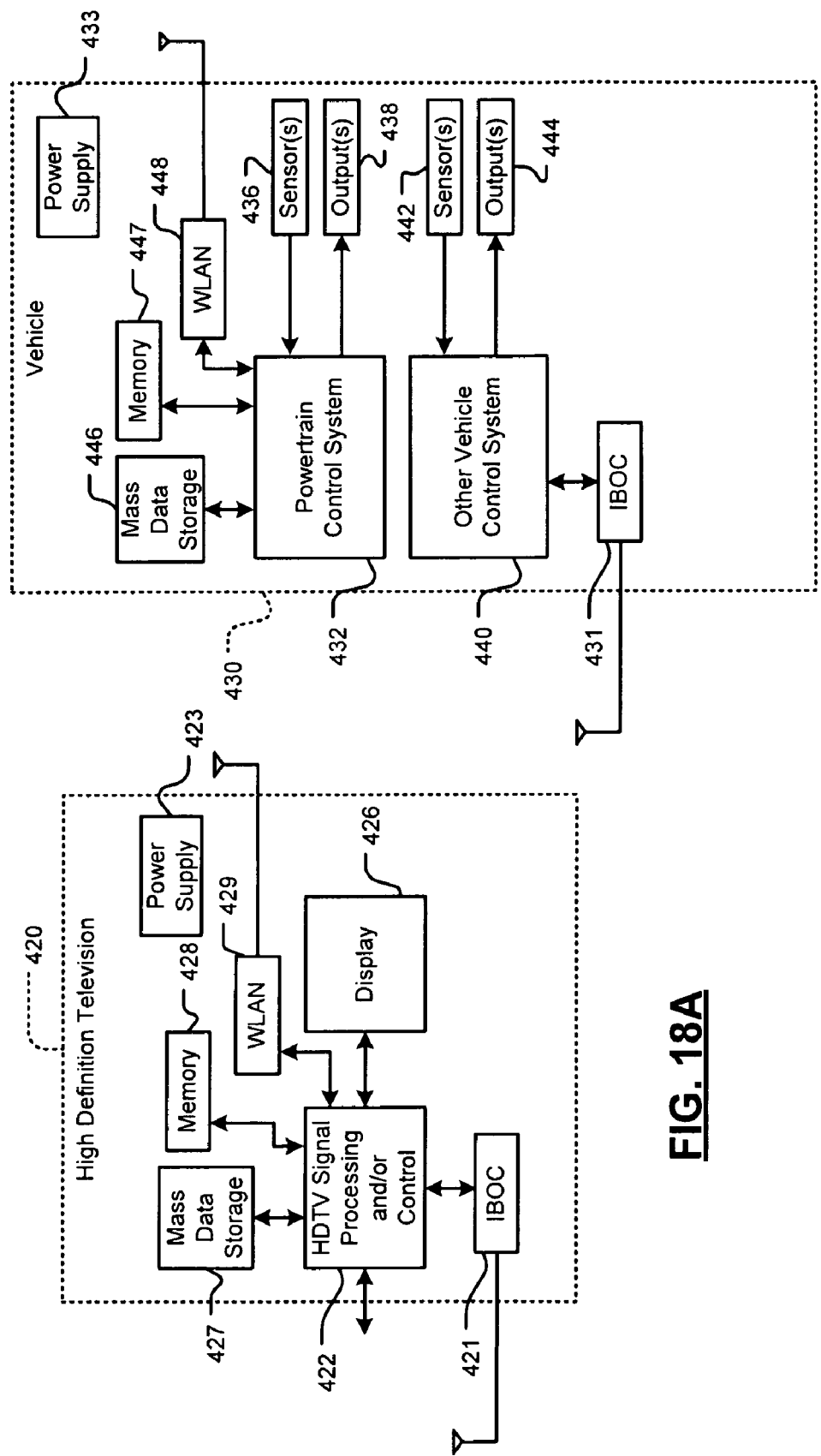

US 7,720,454 B1

EXTREMELY LOW IF ARCHITECTURE FOR IN-BAND ON-CHANNEL (IBOC) RADIO

CROSS-REFERENCE TO RELATED APPLICATIONS

This application claims the benefit of U.S. Provisional Application No. 60/779,801 filed on Mar. 7, 2006. The disclosure of the above application is incorporated herein by reference in its entirety.

FIELD

The present disclosure relates to hybrid in-band, on-channel (IBOC) radio receivers.

BACKGROUND

The Background description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Hybrid in-Band, on-Channel (IBOC) radio signals can be used to simultaneously transmit analog FM stereo and digital sideband signals at a common center frequency. In some implementations the IBOC spectrum allocates 400 KHz bandwidth for each channel wherein the analog FM stereo signal is 200 KHz wide and the upper and lower digital sideband signals are each 100 kHz wide. The digital sideband signals can be modulated using quadrature-amplitude modulation (QAM) over upper and lower single-sideband suppressed carrier signals.

IBOC receivers can employ a first downconverter that converts the received IBOC signal to a 10.7 MHz intermediate frequency (IF). A ceramic filter can remove the image component from the received channel. A second downconverter can then be employed to further convert the received signal to a very low IF that can be demodulated in the digital domain. Alternatively, an FM discriminator process can be employed after the ceramic filter to demodulate the received signal. The ceramic filter can be undesirably bulky and/or expensive.

SUMMARY

A radio frequency (RF) receiver includes an intermediate frequency (IF) mixer that generates an output signal based on mixing a hybrid in-band, on-channel (IBOC) signal with an intermediate frequency signal. An oscillator generates the intermediate frequency signal; wherein the intermediate frequency is less than a bandwidth of the IBOC signal.

In other features the RF receiver includes a notch filter that filters the IBOC signal. The notch filter is a digital filter. The notch filter removes highest frequency components of an analog FM spectrum of the IBOC signal. A selectivity filter filters the output signal. The selectivity filter is a digital filter. The selectivity filter passes an analog FM spectrum of the output signal.

In other features the IBOC signal includes in-phase (I) and quadrature (Q) signals and the intermediate frequency signal includes sine and cosine signals. The IF mixer mixes the sine and cosine signals with the I and Q signals. The IF mixer includes a recombination module that generates an I output signal based on a sum of the I signal mixed with the cosine signal and the Q signal mixed with the sine signal and that generates a Q output signal based on a difference of the Q signal mixed with the cosine signal and the I signal mixed with the sine signal. A local oscillator mixer shifts a center frequency of the IBOC signal.

In other features a gain module equalizes amplitudes of in-phase and quadrature signals that are included in the IBOC signal. An analog-to-digital converter generates the IBOC signal based on a wireless IBOC RF signal. A channel monitoring module generates a control signal based on the output signal; wherein the frequency of the intermediate frequency signal is based on the control signal. The intermediate frequency is less than or equal to one-fourth of the bandwidth of the IBOC signal.

A method of operating a radio frequency (RF) receiver includes generating an output signal based on mixing a hybrid in-band, on-channel (IBOC) signal with an intermediate frequency signal. The method also includes generating the intermediate frequency signal; wherein the intermediate frequency is less than a bandwidth of the IBOC signal.

In other features the method includes notch filtering the IBOC signal. The notch filtering is performed digitally. The method includes removing highest frequency components of an analog FM spectrum of the IBOC signal. The method includes filtering the output signal. The filtering is performed digitally. The filtering step passes an analog FM spectrum of the output signal.

In other features the IBOC signal includes in-phase (I) and quadrature (Q) signals and the intermediate frequency signal includes sine and cosine signals. The method includes mixing the sine and cosine signals with the I and Q signals. The mixing step includes generating an I output signal based on a sum of the I signal mixed with the cosine signal and the Q signal mixed with the sine signal and generating a Q output signal based on a difference of the Q signal mixed with the cosine signal and the I signal mixed with the sine signal. The method includes shifting a center frequency of the IBOC signal. The method includes equalizing amplitudes of in-phase and quadrature signals that are included in the IBOC signal.

In other features the method includes generating the IBOC signal based on a wireless IBOC RF signal. The method includes generating a control signal based on the output signal; wherein the frequency of the intermediate frequency signal is based on the control signal. The intermediate frequency is less than or equal to one-fourth of the bandwidth of the IBOC signal.

A radio frequency (RF) receiver includes intermediate frequency (IF) mixer means for generating an output signal based on mixing a hybrid in-band, on-channel (IBOC) signal with an intermediate frequency signal. Oscillator means generate the intermediate frequency signal; wherein the intermediate frequency is less than a bandwidth of the IBOC signal.

In other features the RF receiver includes notch filter means for filtering the IBOC signal. The notch filter means includes a digital filter. The notch filter means removes highest frequency components of an analog FM spectrum of the IBOC signal. Selectivity filter means filter the output signal. The selectivity filter means includes a digital filter. The selectivity filter means passes an analog FM spectrum of the output signal.

In other features the IBOC signal includes in-phase (I) and quadrature (Q) signals and the intermediate frequency signal includes sine and cosine signals. The IF mixer means mixes the sine and cosine signals with the I and Q signals. The IF mixer means includes recombination means for generating an I output signal based on a sum of the I signal mixed with the cosine signal and the Q signal mixed with the sine signal and generating a Q output signal based on a difference of the Q signal mixed with the cosine signal and the I signal mixed with the sine signal.

In other features the RF receiver includes local oscillator mixer means for shifting a center frequency of the IBOC signal. Gain means equalize amplitudes of in-phase and quadrature signals that are included in the IBOC signal. Analog-to-digital converter means generate the IBOC signal based on a wireless IBOC RF signal. Channel monitoring means generate a control signal based on the output signal; wherein the frequency of the intermediate frequency signal is based on the control signal. The intermediate frequency is less than or equal to one-fourth of the bandwidth of the IBOC signal.

A computer program for operating a radio frequency (RF) receiver can be executed by one or more processors and can reside on a computer readable medium such as but not limited to memory, non-volatile data storage and/or other suitable tangible storage mediums. The computer program includes generating an output signal based on mixing a hybrid in-band, on-channel (IBOC) signal with an intermediate frequency signal. The computer program also includes generating the intermediate frequency signal; wherein the intermediate frequency is less than a bandwidth of the IBOC signal.

In other features the computer program includes notch filtering the IBOC signal. The notch filtering is performed digitally. The computer program includes removing highest frequency components of an analog FM spectrum of the IBOC signal. The computer program includes filtering the output signal. The filtering is performed digitally. The filtering step passes an analog FM spectrum of the output signal.

In other features the IBOC signal includes in-phase (I) and quadrature (Q) signals and the intermediate frequency signal includes sine and cosine signals. The computer program includes mixing the sine and cosine signals with the I and Q signals. The mixing step includes generating an I output signal based on a sum of the I signal mixed with the cosine signal and the Q signal mixed with the sine signal and generating a Q output signal based on a difference of the Q signal mixed with the cosine signal and the I signal mixed with the sine signal. The computer program includes shifting a center frequency of the IBOC signal. The computer program includes equalizing amplitudes of in-phase and quadrature signals that are included in the IBOC signal.

In other features the computer program includes generating the IBOC signal based on a wireless IBOC RF signal. The computer program includes generating a control signal based on the output signal; wherein the frequency of the intermediate frequency signal is based on the control signal. The intermediate frequency is less than or equal to one-fourth of the bandwidth of the IBOC signal.

A computer program of operating a radio frequency (RF) receiver includes generating an output signal based on mixing a hybrid in-band, on-channel (IBOC) signal with an intermediate frequency signal. The computer program also includes generating the intermediate frequency signal; wherein the intermediate frequency is less than a bandwidth of the IBOC signal.

In other features the computer program includes notch filtering the IBOC signal. The notch filtering is performed digitally. The computer program includes removing highest frequency components of an analog FM spectrum of the IBOC signal. The computer program includes filtering the output signal. The filtering is performed digitally. The filtering step passes an analog FM spectrum of the output signal.

In other features the IBOC signal includes in-phase (I) and quadrature (Q) signals and the intermediate frequency signal includes sine and cosine signals. The computer program includes mixing the sine and cosine signals with the I and Q signals. The mixing step includes generating an I output signal based on a sum of the I signal mixed with the cosine signal and the Q signal mixed with the sine signal and generating a Q output signal based on a difference of the Q signal mixed with the cosine signal and the I signal mixed with the sine signal. The computer program includes shifting a center frequency of the IBOC signal. The computer program includes equalizing amplitudes of in-phase and quadrature signals that are included in the IBOC signal.

In other features the computer program includes generating the IBOC signal based on a wireless IBOC RF signal. The computer program includes generating a control signal based on the output signal; wherein the frequency of the intermediate frequency signal is based on the control signal. The intermediate frequency is less than or equal to one-fourth of the bandwidth of the IBOC signal.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 4A-5B are frequency domain plots of signals of a notch filter module of the receiver of FIG. 1;

FIGS. 6A-6C are frequency domain plots of in-phase (I) channel signals of an intermediate frequency mixer module of the receiver of FIG. 1;

FIGS. 7A-7C are frequency domain plots of quadrature (Q) channel signals of the intermediate frequency mixer module of the receiver of FIG. 1;

FIGS. 8A-8C are frequency domain plots of analog FM components of the I-channell-channel signals;

FIGS. 9A-9C are frequency domain plots of analog FM components of the Q channel signals;

FIGS. 11A-11B are frequency domain plots of digital sideband components of the Q channel signals;

FIG. 18A is a functional block diagram of a high definition television;

FIG. 18B is a functional block diagram of a vehicle control system;

DETAILED DESCRIPTION

Figure 1:
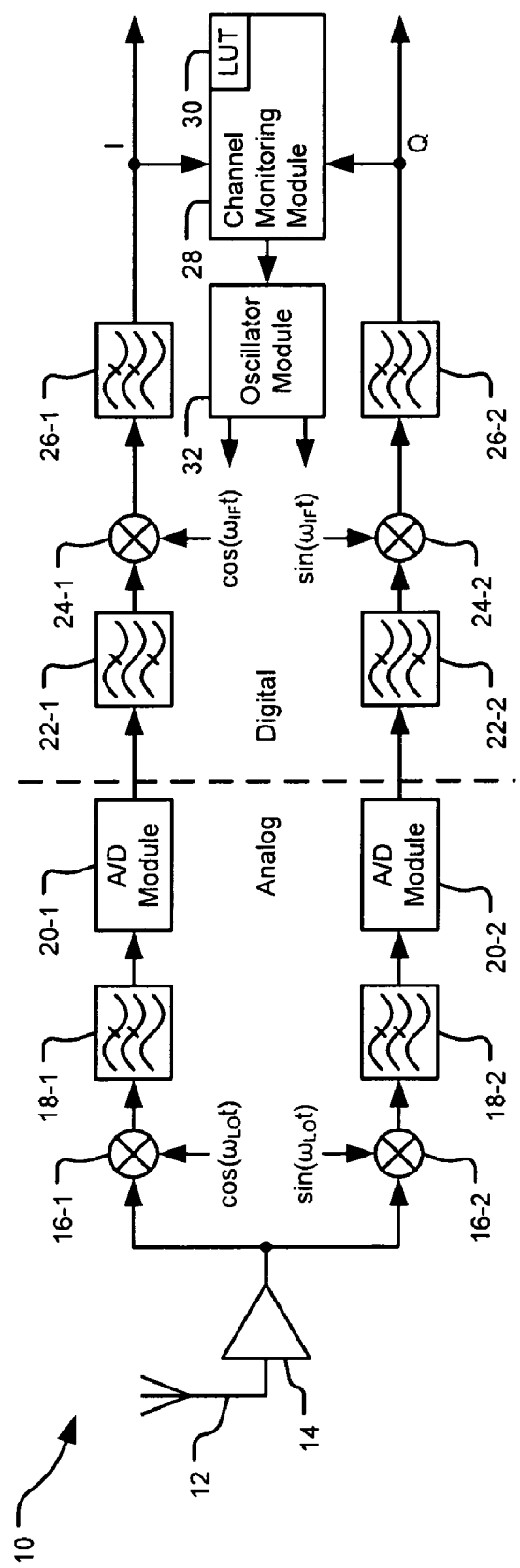
FIG. 1 is a functional block diagram of a radio frequency (RF) receiver with an extremely low intermediate frequency architecture (IF)

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Referring now to FIG. 1 a functional block diagram is shown of a radio frequency (RF) receiver 10 that receives hybrid in-band, on-channel (IBOC) signals. Receiver 10 employs an extremely low intermediate frequency (XLIF) that is at most one-fourth of the channel bandwidth. In some embodiments each IBOC channel has a bandwidth of 400 KHz and the XLIF can then be between 50-90 KHz. The XLIF mitigates image component, DC offset cancellation, 1/f noise and second-order non-linearity (IP2) issues. Receiver 10 uses filter modules to retrieve the analog FM center channel despite partial self-overlapping produced by the XLIF.

An antenna 12 receives and communicates an RF signal to a low noise amplifier (LNA) 14. LNA 14 communicates the RF signal to in-phase (I) and quadrature (Q) local oscillator mixers 16-1, 16-2, which are referred to collectively as local oscillator mixers 16. Local oscillator mixers 16 mix the RF signal with respective signals $\cos(\omega_{LO}t)$ and $\sin(\omega_{LO}t)$ where $\omega_{LO}$ represents a period of the local oscillator signals and t represents time. Outputs of local oscillator mixers 16 communicate with respective inputs of low pass filters 18. Low pass filters 18 provide anti-alias filtering for analog to digital converters (A/Ds) 20. A/Ds 20 generate digital signals based on respective signals from low pass filters 18. In some embodiments a sample frequency of A/Ds 20 is about 12 MHz.

A/Ds 20 communicate the digital signals to respective notch filters 22. A high cutoff frequency of notch filters 22 can be selected based on predetermined limits for DC offset and 1/f noise in the digital signals. A low cutoff frequency of notch filters 22 can be selected based on predetermined limits of DC offset and i/f noise in the digital signals. A high cutoff frequency of notch filters 22 can be selected to reduce sampling noise from A/Ds 20. Outputs of notch filters 22 communicate with inputs of respective IF mixers 24. IF mixers 24 mix signals from respective notch filters 22 with both IF signals $\cos(\omega_{IF}t)$ and $\sin(\omega_{IF}t)$, where $\omega_{IF}$ is the period of the IF signals. Selectivity filters 26 generate I and Q signals based on respective output signals from IF mixers 24. Each of notch filters 22 and selectivity filters 26 can be digitally implemented and include one or more passbands.

A channel monitoring module 28 can monitor the I and Q signals and adjust $\omega_{IF}$ for IF signals $\cos(\omega_{IF}t)$ and $\sin(\omega_{IF}t)$. Channel monitoring module 28 can establish $\omega_{IF}$ based on a look-up table 30 and/or channel conditions. An oscillator module 32 generates the IF signals $\cos(\omega_{IF}t)$ and $\sin(\omega_{IF}t)$ at the established $\omega_{IF}$.

Figure 2:
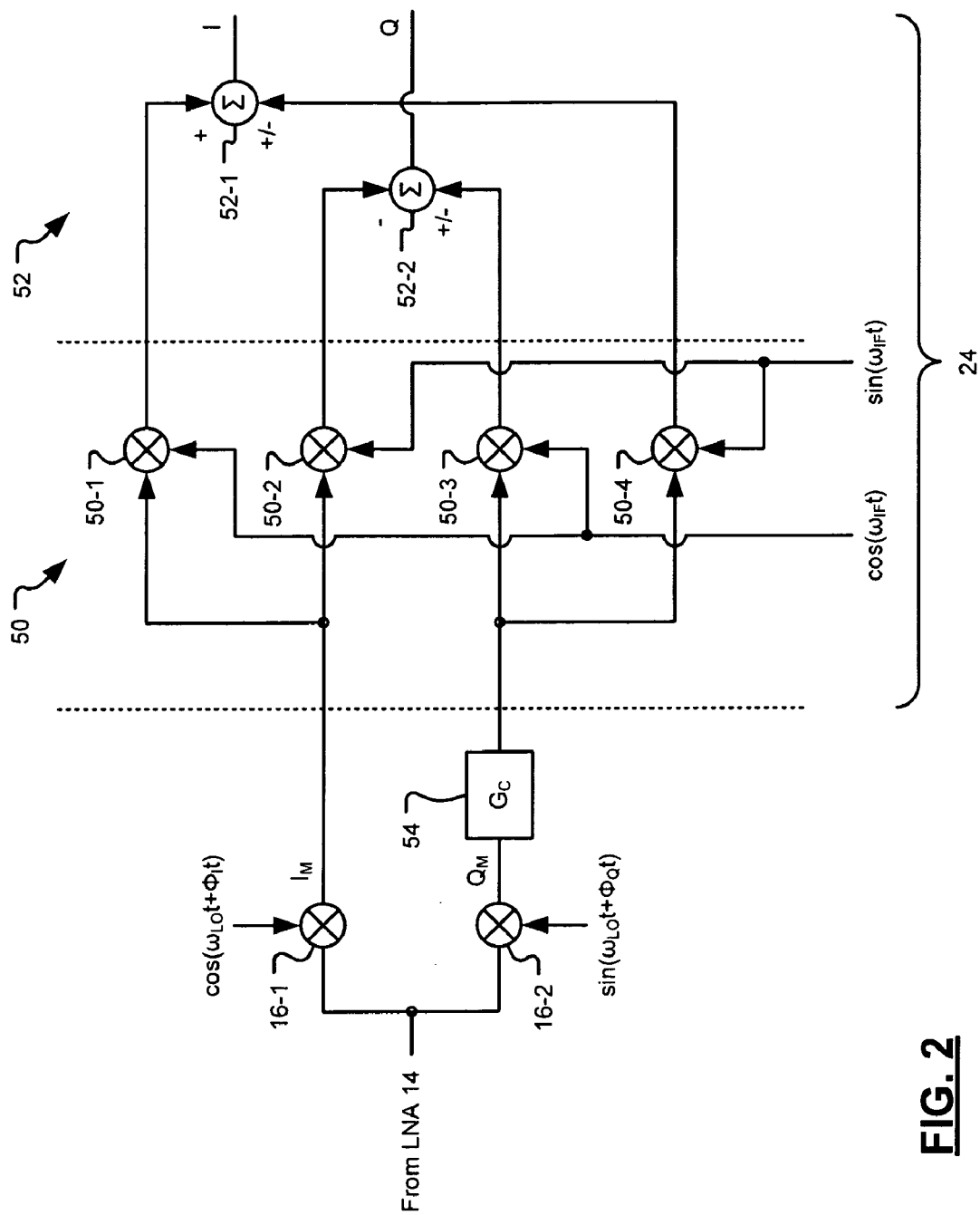
FIG. 2 is a functional block diagram of an IF mixer stage of the RF receiver of FIG. 1.

Referring now to FIG. 2, a functional block diagram is shown of IF mixers 24. IF mixers 24 include a mixer module 50 and a recombination module 52. Mixer module 50 includes four mixers 50-1, ..., 50-4, which are collectively referred to as mixers 50. First and second mixers 50-1 and 50-2 mix the I component signal with the IF signals $\cos(\omega_{IF}t)$ and $\sin(\omega_{IF}t)$, respectively. Third and fourth mixers 50-3 and 50-4 mix the Q component signal with the IF signals $\cos(\omega_{IF}t)$ and $\sin(\omega_{IF}t)$, respectively.

Recombination module 52 includes a first summing module 52-1 and a second summing module 52-2. First summing module 52-1 generates the I signal based on a sum of the outputs of mixers 50-1 and 50-4. One input of first summing module 52-1 can be switched between inverting and non-inverting modes. Second summing module 52-2 generates the Q signal based on a difference of the outputs of mixers 50-2 and 50-3. One input of summing module 52-2 can be switched between inverting and non-inverting modes.

FIG. 2 also shows elements that can be used to equalize the I and Q signals upstream of IF mixers 24. A gain compensation module 54 can compensate the amplitude of the $Q_M$ signal that is communicated from local oscillator mixers 16. A gain $G_C$ of gain compensation module 54 can be adjusted such that the amplitude of the Q signal at the output of gain compensation module 54 is equal to the amplitude of the $I_M$ signal that is communicated from local oscillator mixers 16. A phase shift between the $I_M$ and $Q_M$ signals can be corrected to 90 degrees by adding phase shift terms $\phi_I t$ and/or $\phi_Q t$ to the respective cosine and/or sine signal inputs of local oscillator mixers 16.

Figure 3:
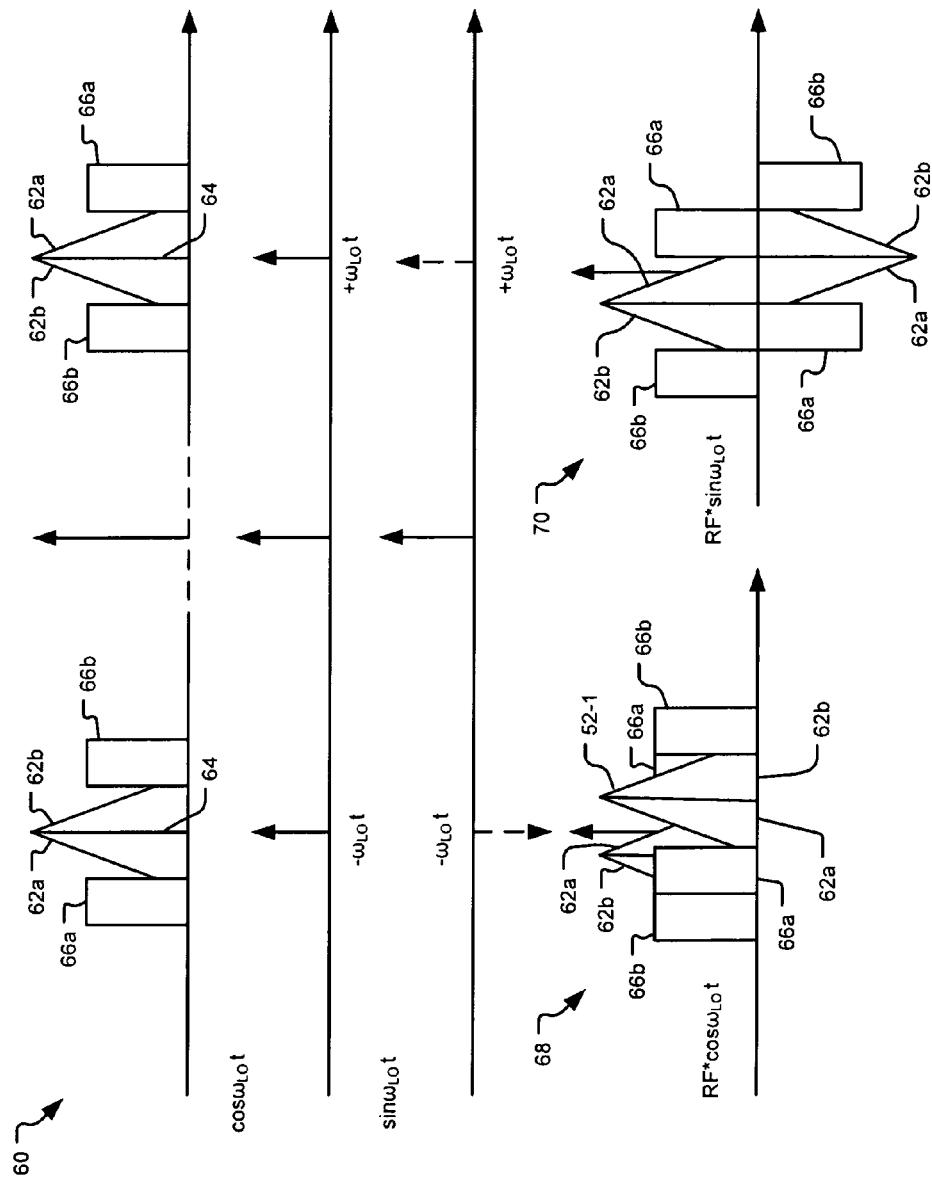
FIG. 3 is frequency domain plots of signals of a local oscillator mixer module of the receiver of FIG. 1.

Referring now to FIG. 3, a frequency domain plot shows signal components of the received signal 60 at the inputs of both local oscillator mixers 16. Received signal 60 includes an analog FM stereo signal 62 with components 62a, 62b that are below and above a center frequency 64. Received signal 60 also includes a lower sideband 66a and an upper sideband 66b that carry the digital information.

Local oscillator mixer 16-1 mixes received signal 60 with $\cos(\omega_{LO}t)$ to generate an in-phase (I) signal that has the spectral components that are shown generally at 68. Local oscillator mixer 16-2 mixes received signal 60 with $\sin(\omega_{LO}t)$ to generate a quadrature (Q) signal that has the spectral components that are shown generally at 70.

Referring now to FIGS. 4A-5B the effects of notch filters 22 are shown. Notch filters 22 remove peak frequency components of the lower FM signal component 62a. At FIG. 4A a passband 72 of notch filter 22-1 is shown superimposed on the I signal spectrum 68. The I signal spectrum at the output of notch filter 22-1 is shown at FIG. 4B.

At FIG. 5A passband 72 of notch filter 22-2 is shown superimposed on Q signal spectrum 70. The Q signal spectrum at the output of notch filter 22-2 is shown generally at FIG. 5B.

Referring now to FIGS. 6A-6C, spectrum diagrams are shown for the I-channel signals that enter and exit mixer modules 50-1 and 50-2. FIG. 6A shows the spectrum of the I-channel signal as it enters mixer modules 50-1 and 50-2. Mixer module 50-1 mixes the I-channel signal with the signal $\cos(\omega_{IF}t)$ and thereby generates a signal that includes the spectrum shown at FIG. 6B. Mixer module 50-2 mixes the I-channel signal with the signal $\sin(\omega_{IF}t)$ and thereby isolate a signal that includes the spectrum shown at FIG. 6C.

Referring now to FIGS. 7A-7C, spectrum diagrams are shown for the Q-channel signals that enter and exit mixer modules 50-3 and 50-4. FIG. 7A shows the spectrum of the Q-channel signal as it enters mixer modules 50-3 and 50-4. Mixer module 50-3 mixes the Q-channel signal with the signal $\cos(\omega_{IF}t)$ and thereby generates a signal that includes the spectrum shown at FIG. 7B. Mixer module 50-4 mixes the Q-channel signal with the signal $\sin(\omega_{IF}t)$ and thereby generates a signal that includes the spectrum shown at FIG. 7C. Recombination module 52 adds and/or subtracts the signals from mixer modules 50 to generate the analog FM components in a baseband I signal.

Referring now to FIGS. 8A-8C, spectrum diagrams are shown for the I-channel signals that enter summing module 52-1 and exit a low-pass passband of selectivity filter 26-1. FIG. 8A represents the signal spectrum at the output of summing module 52-1 when its switchable input is in the non-inverting mode. FIG. 8B represents the signal spectrum at the output of summing module 52-1 when its switchable input is in the inverting mode. The pass band of the low-pass portion of selectivity filter 26-1 is shown at 80. FIG. 8C represents a single side band (SSB) portion of the analog FM signal spectrum at the output of selectivity filter 26-1.

Referring now to FIGS. 9A-9C, spectrum diagrams are shown for the Q-channel signals that enter summing module 52-2 and exit a low-pass portion of selectivity filter 26-2. FIG. 9A represents the signal spectrum at the output of summing module 52-2 when its switchable input is in the non-inverting mode. FIG. 9B represents the signal spectrum at the output of summing module 52-2 when its switchable input is in the inverting mode. A pass band of low-pass filter 26-2 is shown at 80. FIG. 9C represents the analog FM portion of the signal spectrum at the output of low-pass filter 26-2.

Figure 10B:
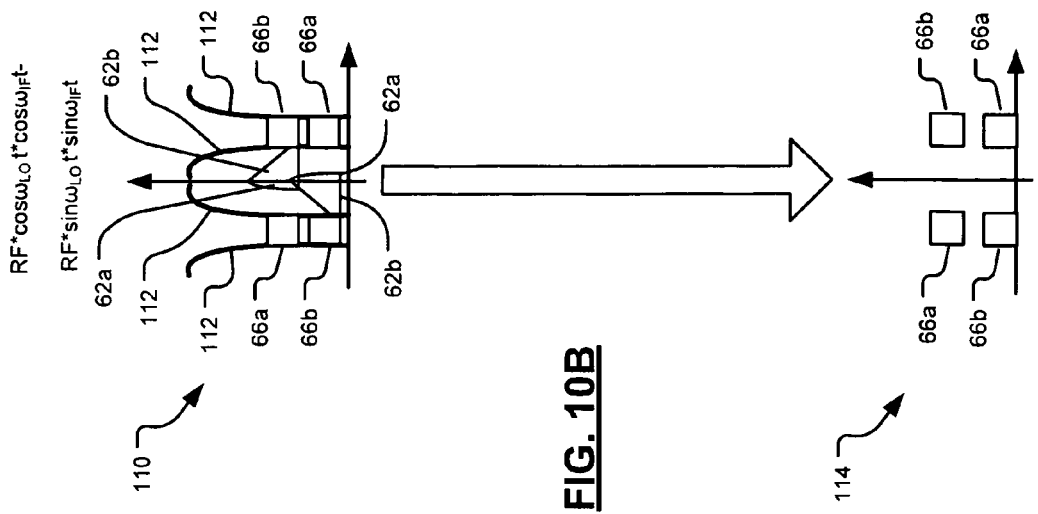
FIGS. 10A-10B are frequency domain plots of digital sideband components of the I-channell-channel signals.
Figure 10A:
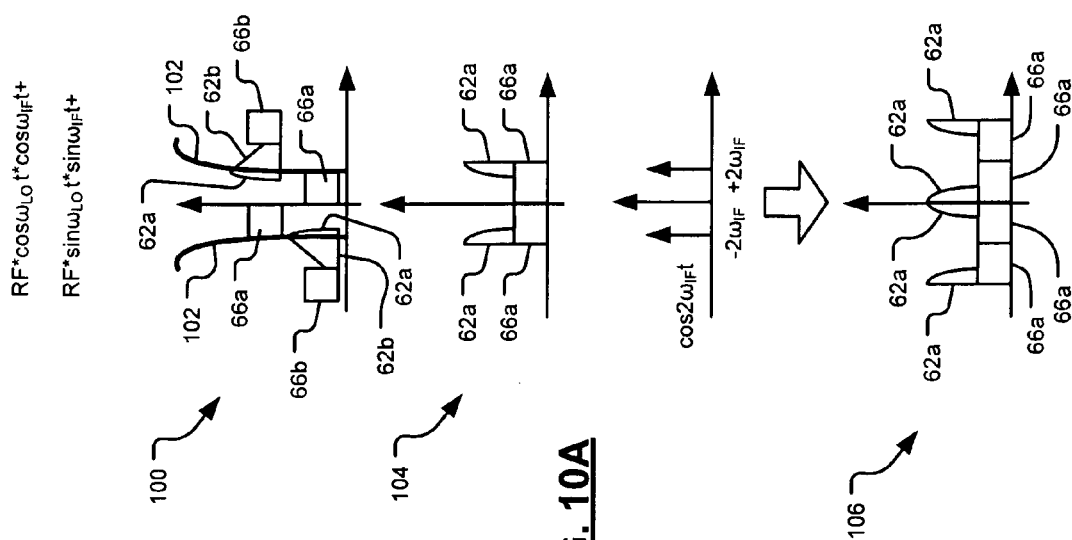

Referring now to FIG. 10A, spectrum diagrams are shown that illustrate IF conversion steps for isolating lower sideband 62$a$ in the I-channel. The lower sideband I-channel spectrum at the input of notch filter 22-1 is shown generally at 100. A passband of notch filter 22-1 is represented by lines 102. In some embodiments a width of the passband is equal to 100 kHz or the bandwidth of the lower sideband 62$a$. The lower sideband output spectrum of notch filter 22-1 is shown generally at 104 and applied to IF mixer 24-1. The lower sideband output spectrum of IF mixer 24-1 is shown generally at 106.

Referring now to FIG. 10B, spectrum diagrams are shown that illustrate IF conversion steps for isolating upper sideband 62$b$ in the I-channel. The upper sideband I-channel spectrum at the input of notch filter 22-1 is shown generally at 110. Passbands of notch filter 22-1 are represented by lines 112. In some embodiments the widths of the passbands are equal to 100 kHz or the bandwidth of the upper sideband 62$b$. The upper sideband output spectrum of notch filter 22-1 is shown generally at 114. The upper sideband output spectrum 114 bypasses IF mixer 24-1 and is applied to selectivity filter 26-1.

Referring now to FIG. 11A, spectrum diagrams are shown that illustrate IF conversion steps for isolating lower sideband 62$a$ in the Q-channel. The lower sideband Q-channel spectrum at the input of notch filter 22-2 is shown generally at 120. A passband of notch filter 22-2 is represented by lines 122. In some embodiments a width of the passband is equal 100 kHz or the bandwidth of the lower sideband 62$a$. The lower sideband output spectrum of notch filter 22-2 is shown generally at 124 and applied to IF mixer 24-2. The lower sideband output spectrum of IF mixer 24-2 is shown generally at 126.

Referring now to FIG. 11B, spectrum diagrams are shown that illustrate IF conversion steps for isolating upper sideband 62$b$ in the Q-channel. The upper sideband Q-channel spectrum at the input of notch filter 22-2 is shown generally at 130.

Passbands of notch filter 22-2 are represented by lines 132. In some embodiments the widths of the passbands are equal to 100 kHz or the bandwidth of the upper sideband 62$b$. The upper sideband output spectrum of notch filter 22-2 is shown generally at 134. The upper sideband output spectrum 134 bypasses IF mixer 24-2 and is applied to selectivity filter 26-2.

Figure 12:
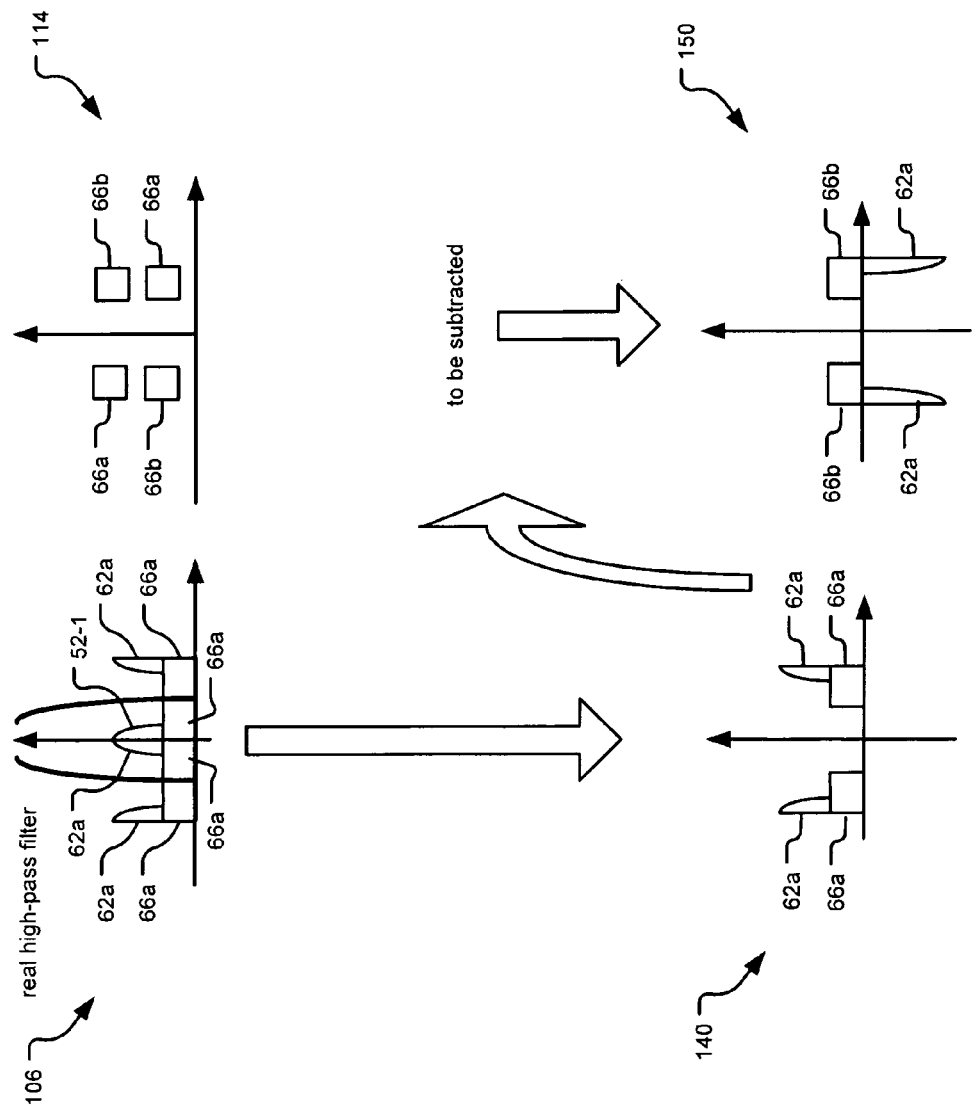
FIG. 12 is a frequency domain plot of filtered digital sideband components of the I-channel signals.

Referring now to FIG. 12, a high-pass portion of selectivity filter 26-1 is shown superimposed on the lower sideband spectrum 106 at the output of IF mixer 24-1. The output spectrum of selectivity filter 26-1 is shown generally at 140. The output spectrum 114 from notch filter 22-1 can be subtracted from the output spectrum 140 to isolate upper sideband 66$b$ in a portion of the baseband I signal, which is shown generally at 150. The upper sideband portion at 150 includes remnants of the lower portion 62$a$ of the analog FM channel. The lower portion 62$a$ can be estimated based on the filter properties of low-pass filters 18 and then subtracted out.

Figure 13:
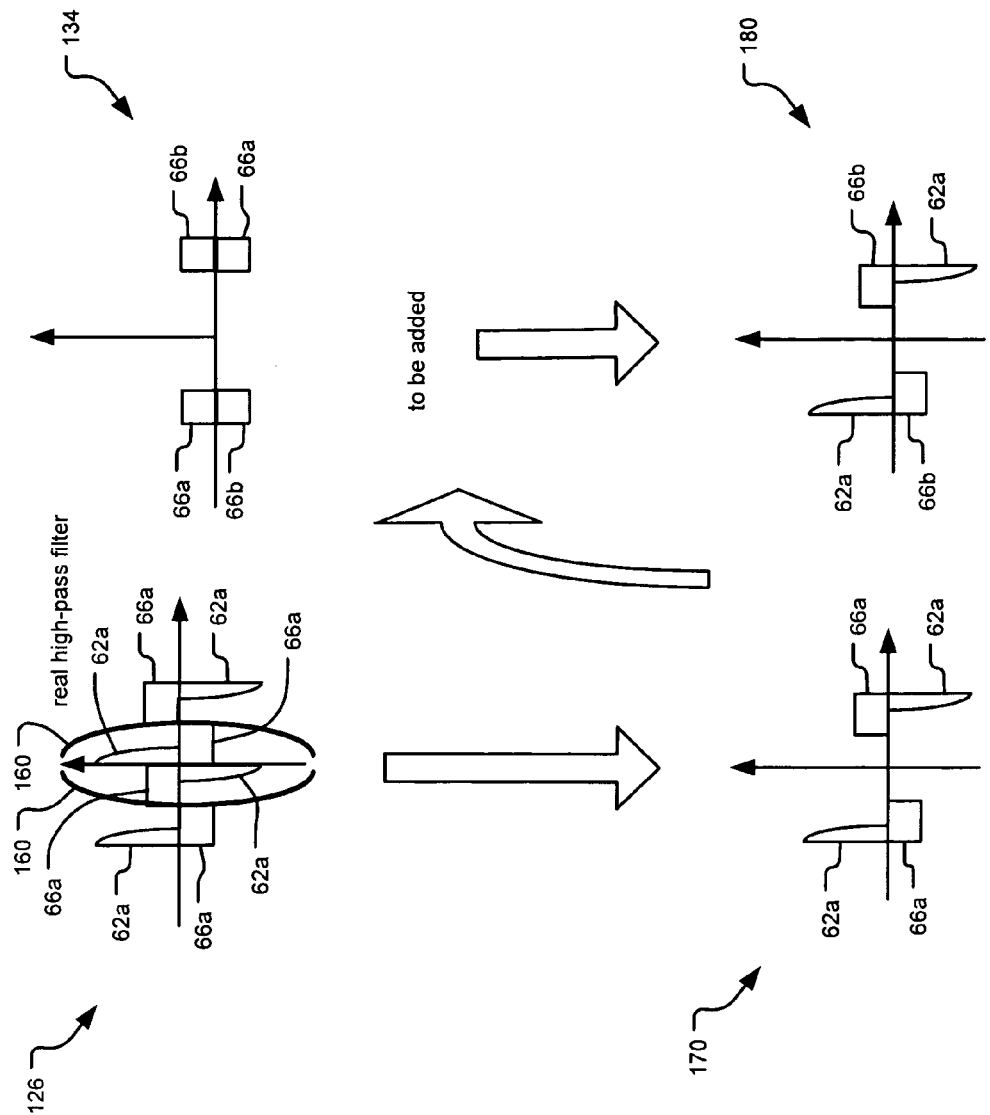
FIG. 13 is a frequency domain plot of filtered digital sideband components of the Q channel signals.
Figure 14:
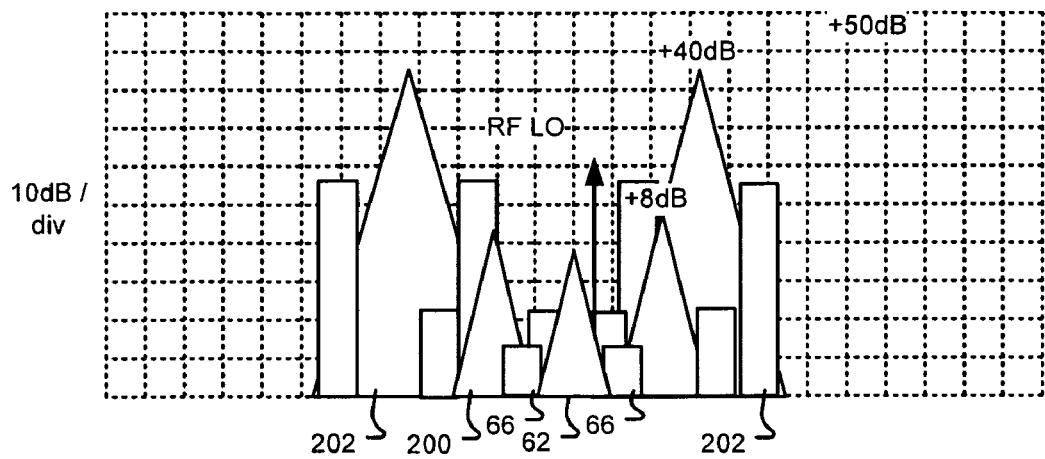
FIG. 14 is a frequency domain plot of hybrid-mode, In-Band, On-Channel (IBOC) adjacent channels.
Figure 15:
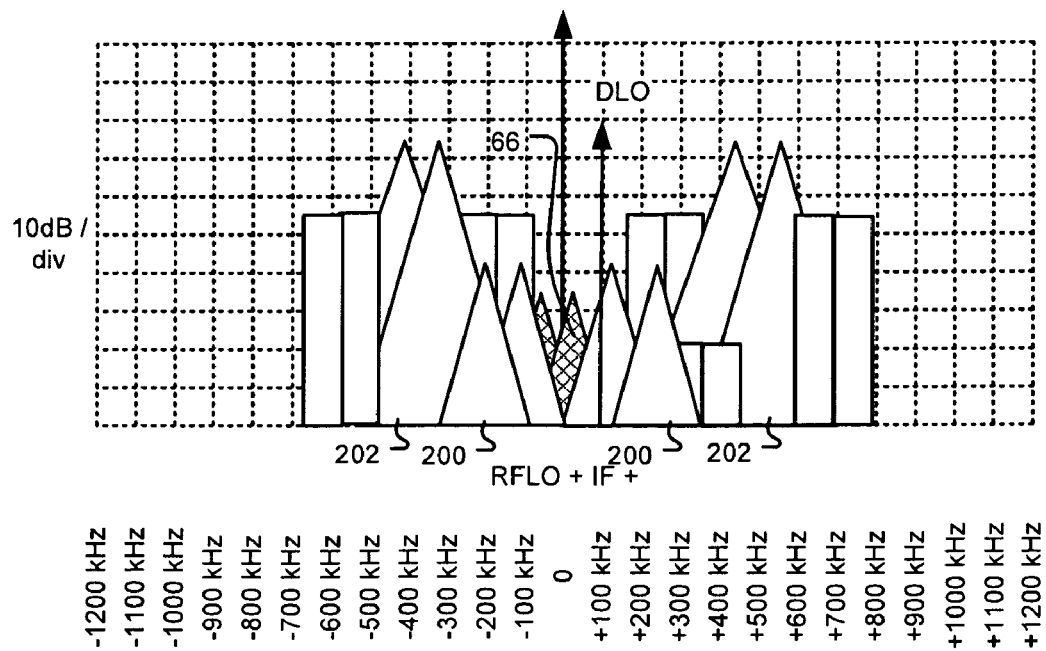
FIG. 15 is a frequency domain plot of the adjacent channels at the IF mixer stage of the receiver of FIG. 1.
Figure 16:
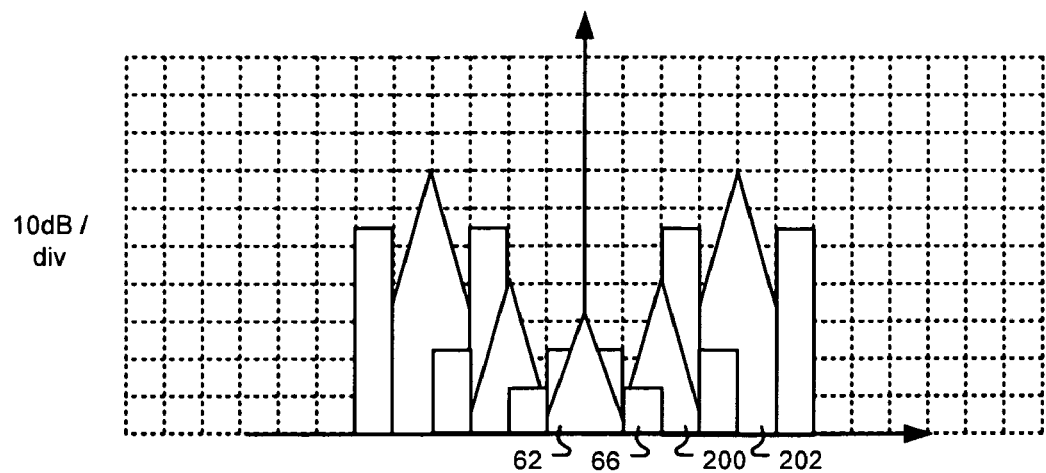
FIG. 16 is a frequency domain plot of non-image baseband signals at an output of the receiver of FIG. 1.

Referring now to FIG. 13, a high-pass portion of selectivity filter 26-2 is shown superimposed on the lower sideband spectrum 126 at the output of IF mixer 24-2. The output spectrum of selectivity filter 26-2 is shown generally at 170. The output spectrum 134 from notch filter 22-2 can be added to the output spectrum 170 to isolate lower sideband 66$b$ in a portion of the baseband Q signal, which is shown generally at 180. The lower sideband portion at 180 includes remnants of the lower portion 62$a$ of the analog FM channel. The lower portion 62$a$ can be estimated based on the filter properties of low-pass filters 18 and then subtracted out.

Referring now to FIGS. 14-17, frequency domain plots are shown for the RF spectrum, IF spectrum, non-image channels in the baseband spectrum and image channels in the baseband spectrum, respectively. The frequency domain plots assume IF=50 KHz; however, other IF frequencies may be used. The frequency domain plots include the center channel components 62 and 66, first adjacent channels 200, and second adjacent channels 202. Each channel includes the analog FM center with 200 KHz bandwidth and the upper and lower digital sidebands with 100 KHz each.

Figure 17:
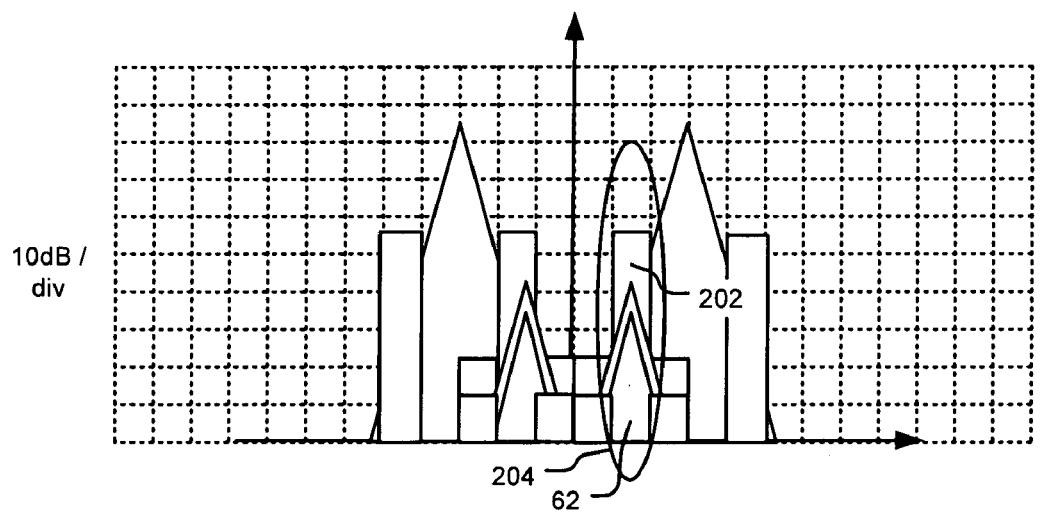
FIG. 17 is a frequency domain plot of the image baseband signals at the output of the receiver of FIG. 1.

Referring now to FIG. 17, a circled area 204 shows that the digital band of the second adjacent channel 202 overlays the center channel 62 by 40 dB. Low pass filters 18 and balanced IF mixers 24 therefore should provide at least 55 dB of image rejection for the digital portion of second adjacent channel 202. The filtering and IF mixing should be phase and magnitude equalized to minimize distorting digital portion 66 of the center channel.

Figure 18C:
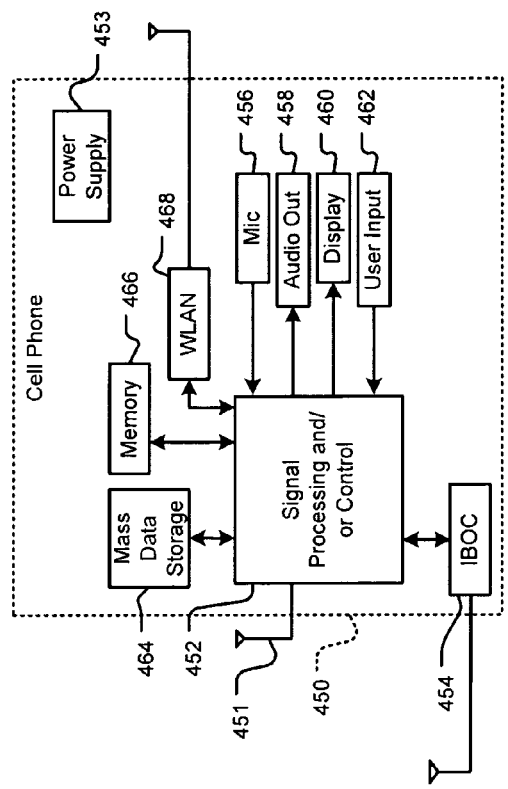
FIG. 18C is a functional block diagram of a cellular phone.

Referring now to FIGS. 18A-18E, various exemplary implementations are shown of IBOC receivers that employ the XLIF systems and methods described herein. Referring now to FIG. 18A, an IBOC receiver 421 can be implemented in a high definition television (HDTV) 420. The HDTV 420 receives HDTV input signals in either a wired or wireless format and generates HDTV output signals for a display 426. In some implementations, a signal processing circuit and/or a control circuit 422 and/or other circuits (not shown) of the HDTV 420 may process data, perform coding and/or encryption, perform calculations, format data and/or perform any other type of HDTV processing that may be required. The IBOC receiver may communicate with the signal processing circuit and/or a control circuit 422.

The HDTV 420 may communicate with mass data storage 427 that stores data in a nonvolatile manner such as optical and/or magnetic storage devices such as hard disk drives (HDDs). At least one HDD may be a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may support connections with a WLAN via a WLAN interface 429. The HDTV 420 may also include a power supply 423.

Referring now to FIG. 18B, an IBOC receiver 431 may be implemented in a vehicle 430. The vehicle 430 includes a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The IBOC receiver 431 may communicate with other control systems 440 of the vehicle 430. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may communicate with mass data storage 446 that stores data in a nonvolatile manner. The mass data storage 446 may include optical and/or magnetic storage devices such as HDDs and/or DVDs. At least one HDD may be a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 also may support connections with a WLAN via a WLAN interface 448. The control system 440 may also include mass data storage, memory and/or a WLAN interface (all not shown). The vehicle 430 may also include a power supply 433.

Referring now to FIG. 18C, an IBOC receiver 454 can be implemented in a cellular phone 450 that may include a cellular antenna 451. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions. The IBOC receiver 481 may communicate with the signal processing and/or control circuits 452

The cellular phone 450 may communicate with mass data storage 464 that stores data in a nonvolatile manner such as optical and/or magnetic storage devices such as HDDs and/or DVDs. At least one HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via a WLAN network interface 468. The cellular phone 450 may also include a power supply 483.

Figure 18D:
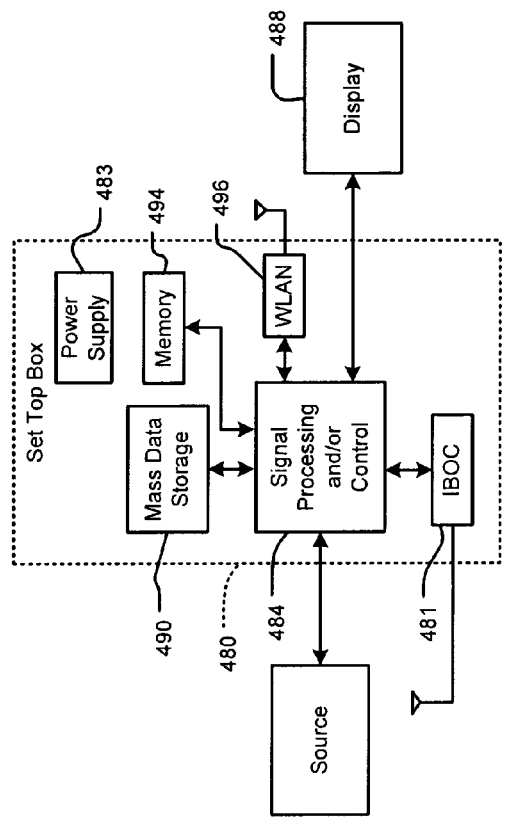
FIG. 18D is a functional block diagram of a set top box.

Referring now to FIG. 18D, an IBOC receiver 481 can be implemented in a set top box 480. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function. The IBOC receiver 481 may communicate with the signal processing and/or control circuits 484 and/or other circuits.

The set top box 480 may communicate with mass data storage 490 that stores data in a nonvolatile manner. The mass data storage 490 may include optical and/or magnetic storage devices such as HDDs and/or DVDs. At least one HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via a WLAN network interface 496. The set-top box 480 may also include a power supply 483.

Figure 18E:
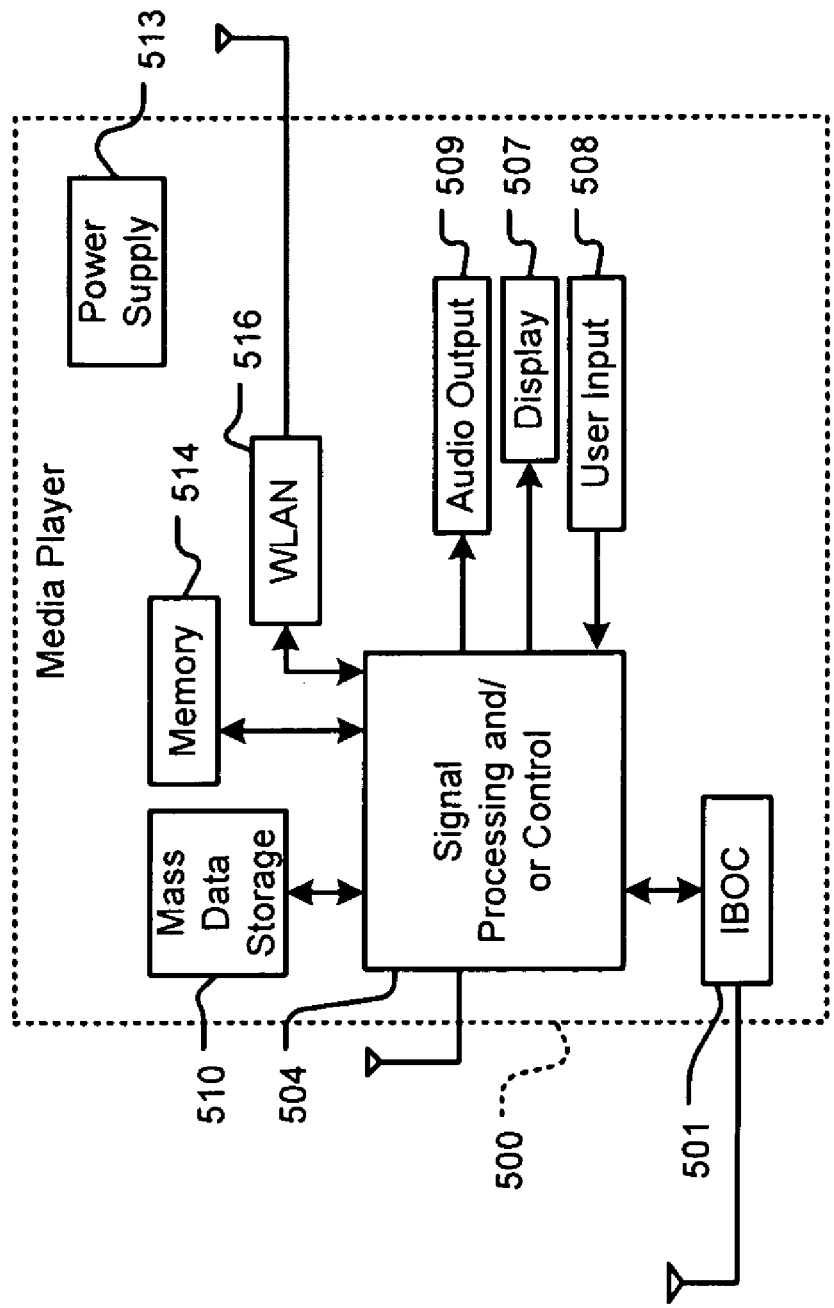
FIG. 18E is a functional block diagram of a media player.

Referring now to FIG. 18E, an IBOC receiver 501 can be implemented in a media player 500. In some implementations, the media player 500 includes a display 507 and/or a user input device 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function. The IBOC receiver 501 may communicate with the signal processing and/or control circuits 504.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices such as HDDs and/or DVDs. At least one HDD may have the configuration shown in FIG. 9A and/or at least one DVD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via a WLAN network interface 516. The media player 500 also may include a power supply 513. Still other implementations in addition to those described above are contemplated.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A radio frequency (RF) receiver comprising:
   an intermediate frequency (IF) mixer that generates an output signal based on mixing a hybrid in-band, on-channel (IBOC) signal with an intermediate frequency signal; and
   an oscillator that generates the intermediate frequency signal; wherein the intermediate frequency is less than a bandwidth of the IBOC signal.

2. The RF receiver of claim 1 further comprising a notch filter that filters the IBOC signal.

3. The RF receiver of claim 2 wherein the notch filter is a digital filter.

4. The RF receiver of claim 3 wherein the notch filter removes highest frequency components of an analog FM spectrum of the IBOC signal.

5. The RF receiver of claim 1 further comprising a selectivity filter that filters the output signal.

6. The RF receiver of claim 5 wherein the selectivity filter is a digital filter.

7. The RF receiver of claim 6 wherein the selectivity filter passes an analog FM spectrum of the output signal.

8. The RF receiver of claim 1 wherein the IBOC signal includes in-phase (I) and quadrature (Q) signals and the intermediate frequency signal includes sine and cosine signals.

9. The RF receiver of claim 8 wherein the IF mixer mixes the sine and cosine signals with the I and Q signals.

10. The RF receiver of claim 9 wherein the IF mixer includes a recombination module that generates an I output signal based on a sum of the I signal mixed with the cosine signal and the Q signal mixed with the sine signal and that generates a Q output signal based on a difference of the Q signal mixed with the cosine signal and the I signal mixed with the sine signal.

11. The RF receiver of claim 1 further comprising a local oscillator mixer that shifts a center frequency of the IBOC signal.

12. The RF receiver of claim 11 further comprising a gain module that equalizes amplitudes of in-phase and quadrature signals that are included in the IBOC signal.

13. The RF receiver of claim 12 further comprising an analog-to-digital converter that generates the IBOC signal based on a wireless IBOC RF signal.

14. The RF receiver of claim 1 further comprising a channel monitoring module that generates a control signal based on the output signal; wherein the frequency of the intermediate frequency signal is based on the control signal.

15. The RF receiver of claim 1 wherein the intermediate frequency is less than or equal to one-fourth of the bandwidth of the IBOC signal.

16. A method of operating a radio frequency (RF) receiver, comprising:
generating an output signal based on mixing a hybrid in-band, on-channel (IBOC) signal with an intermediate frequency signal; and
generating the intermediate frequency signal; wherein the intermediate frequency is less than a bandwidth of the IBOC signal.

17. The method of claim 16 further comprising notch filtering the IBOC signal.

18. The method of claim 17 wherein the notch filtering is performed digitally.

19. The method of claim 18 further comprising removing highest frequency components of an analog FM spectrum of the IBOC signal.

20. The method of claim 16 further comprising filtering the output signal.

21. The method of claim 20 wherein the filtering is performed digitally.

22. The method of claim 21 wherein the filtering step passes an analog FM spectrum of the output signal.

23. The method of claim 16 wherein the IBOC signal includes in-phase (I) and quadrature (Q) signals and the intermediate frequency signal includes sine and cosine signals.

24. The method of claim 23 further comprising mixing the sine and cosine signals with the I and Q signals.

25. The method of claim 24 wherein the mixing step includes generating an I output signal based on a sum of the I signal mixed with the cosine signal and the Q signal mixed with the sine signal and generating a Q output signal based on a difference of the Q signal mixed with the cosine signal and the I signal mixed with the sine signal.

26. The method of claim 16 further comprising shifting a center frequency of the IBOC signal.

27. The method of claim 26 further comprising equalizing amplitudes of in-phase and quadrature signals that are included in the IBOC signal.

28. The method of claim 27 further comprising generating the IBOC signal based on a wireless IBOC RF signal.

29. The method of claim 16 further comprising generating a control signal based on the output signal; wherein the frequency of the intermediate frequency signal is based on the control signal.

30. The method of claim 16 wherein the intermediate frequency is less than or equal to one-fourth of the bandwidth of the IBOC signal.

31. A radio frequency (RF) receiver comprising:
intermediate frequency (IF) mixer means for generating an output signal based on mixing a hybrid in-band, on-channel (IBOC) signal with an intermediate frequency signal; and
oscillator means for generating the intermediate frequency signal; wherein the intermediate frequency is less than a bandwidth of the IBOC signal.

32. The RF receiver of claim 31 further comprising notch filter means for filtering the IBOC signal.

33. The RF receiver of claim 32 wherein the notch filter means includes a digital filter.

34. The RF receiver of claim 33 wherein the notch filter means removes highest frequency components of an analog FM spectrum of the IBOC signal.

35. The RF receiver of claim 31 further comprising selectivity filter means for filtering the output signal.

36. The RF receiver of claim 35 wherein the selectivity filter means includes a digital filter.

37. The RF receiver of claim 36 wherein the selectivity filter means passes an analog FM spectrum of the output signal.

38. The RF receiver of claim 31 wherein the IBOC signal includes in-phase (I) and quadrature (Q) signals and the intermediate frequency signal includes sine and cosine signals.

39. The RF receiver of claim 38 wherein the IF mixer means mixes the sine and cosine signals with the I and Q signals.

40. The RF receiver of claim 39 wherein the IF mixer means includes recombination means for generating an I output signal based on a sum of the I signal mixed with the cosine signal and the Q signal mixed with the sine signal and generating a Q output signal based on a difference of the Q signal mixed with the cosine signal and the I signal mixed with the sine signal.

41. The RF receiver of claim 31 further comprising local oscillator mixer means for shifting a center frequency of the IBOC signal.

42. The RF receiver of claim 41 further comprising gain means for equalizing amplitudes of in-phase and quadrature signals that are included in the IBOC signal.

43. The RF receiver of claim 42 further comprising analog-to-digital converter means for generating the IBOC signal based on a wireless IBOC RF signal.

44. The RF receiver of claim 31 further comprising channel monitoring means for generating a control signal based on the output signal; wherein the frequency of the intermediate frequency signal is based on the control signal.

45. The RF receiver of claim 31 wherein the intermediate frequency is less than or equal to one-fourth of the bandwidth of the IBOC signal.

* * * * *